(12) United States Patent
Kitamura et al.

(10) Patent No.: US 7,652,837 B2
(45) Date of Patent: Jan. 26, 2010

(54) DATA ERASURE APPARATUS AND DATA ERASURE METHOD

(75) Inventors: Mitsuru Kitamura, Kanagawa (JP); Masahiko Katoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 551 days.

(21) Appl. No.: 11/486,689

(22) Filed: Jul. 13, 2006

(65) Prior Publication Data

US 2007/0014044 A1    Jan. 18, 2007

(30) Foreign Application Priority Data

Jul. 15, 2005    (JP)    ............... 2005-206715

(51) Int. Cl.
*G11B 5/03*    (2006.01)
*H01F 13/00*   (2006.01)

(52) U.S. Cl. ............... 360/66; 361/149; 361/267

(58) Field of Classification Search ............... None
See application file for complete search history.

(56) References Cited

U.S. PATENT DOCUMENTS

| 5,416,664 | A  * | 5/1995 | Becker et al. ............... 361/149 |
| 6,570,727 | B1   | 5/2003 | Tamura et al. |
| 6,594,099 | B2   | 7/2003 | Serizawa |
| 7,092,188 | B2 * | 8/2006 | Price et al. ............... 360/66 |
| 7,164,569 | B1 * | 1/2007 | Thiel et al. ............... 361/149 |
| 2003/0227734 | A1 * | 12/2003 | Schultz ............... 361/143 |
| 2004/0043420 | A1   | 3/2004 | Fowlkes et al. |
| 2004/0051989 | A1   | 3/2004 | Hasegawa et al. |
| 2005/0041319 | A1   | 2/2005 | Hasegawa et al. |
| 2006/0018075 | A1 * | 1/2006 | Schultz ............... 361/143 |
| 2006/0146435 | A1 * | 7/2006 | Hasegawa et al. ............ 360/66 |
| 2007/0247776 | A1 * | 10/2007 | Tamura et al. ............... 361/149 |

FOREIGN PATENT DOCUMENTS

| JP | 2004-110908 | 4/2004 |
| WO | WO 98/49674 | 11/1998 |

* cited by examiner

*Primary Examiner*—Jason C Olson
(74) *Attorney, Agent, or Firm*—Townsend and Townsend and Crew LLP; John Henkhaus

(57) ABSTRACT

Embodiments of the invention relate to erasing data recorded on a magnetic disk with increased certainty by using an external magnetic field. One embodiment is directed to a method for erasing data recorded on a magnetic disk, which is housed in a magnetic disk drive, by using an external erasure magnetic field generated by an external erasure magnetic field generator. The method comprises the steps of: moving a first magnetic disk drive within an external erasure magnetic field in a moving state appropriate for the type of the first magnetic disk drive, and erasing data recorded on a magnetic disk in the first magnetic disk drive; and moving a second magnetic disk drive, which differs in type from the first magnetic disk drive, within an external erasure magnetic field in a moving state that differs from the moving state of the first magnetic disk drive, and erasing data recorded on a magnetic disk in the second magnetic disk drive.

15 Claims, 9 Drawing Sheets

(a)

(b)

DATA ERASURE APPARATUS AND DATA ERASURE METHOD

CROSS-REFERENCES TO RELATED APPLICATIONS

This application claims priority from Japanese Patent Application No. JP2005-206715, filed Jul. 15, 2005, the entire disclosure of which is incorporated herein by reference.

BACKGROUND OF THE INVENTION

The present invention relates to an apparatus and method for erasing data recorded on a magnetic disk, and more particularly to an apparatus and a method for erasing magnetic disk data by making use of an external magnetic field.

A typical hard disk drive includes a magnetic disk, a spindle motor for rotating the magnetic disk, and a magnetic head for writing data onto and reading data from the magnetic disk. The hard disk drive is provided with an enclosure case, which houses components. The enclosure case generally includes a box-type base, which has an opening, and a plate-like top cover, which covers the opening in the base.

The hard disk drive is completely assembled by placing the components within the base and installing the top cover over the opening in the base. After completion of assembly, a servo pattern is written onto the magnetic disk. After completion of a servo pattern write, the hard disk drive is subjected to various tests prior to product shipment. If the hard disk drive is found to be defective, parts irrelevant to a defect are collected after hard disk drive disassembly and reused. When the magnetic disk is to be reused, it is necessary to erase the written servo pattern for the purpose of avoiding the interference with a new servo pattern that will be written for a new product. If the written servo pattern is found to be defective, it is also necessary to erase such a servo pattern. Further, test data is written on the magnetic disk for testing prior to product shipment. Therefore, it is also necessary to erase the test data from a hard disk drive that is found to be defective.

In recent years, data erasure is also an important concern for hard disk drives that are to be discarded due, for instance, to a defect. When, for instance, the aforementioned spindle motor or magnetic head becomes defective, the information stored on the hard disk drive cannot be read by performing a normal procedure. As a result, it is found that the hard disk drive is defective. However, the magnetic disk still stores information, which could be read by using an appropriate apparatus and method. Therefore, the defective hard disk drive should not be discarded as is from the viewpoint of information protection. It is preferred that the defective hard disk drive be discarded after completely erasing the information recorded on the magnetic disk.

A conventional method used to solve the above problem is to make the information stored on the magnetic disk in the defective hard disk drive unreadable by physically damaging the defective hard disk drive before it is discarded. From the viewpoint of parts recycling and garbage separation, however, the hard disk drive should not be physically damaged for disposal purposes. Even when only the magnetic disk is to be physically damaged, it is necessary to remove the magnetic disk from the housing. Thus, this conventional method does not work efficiently when a large amount of hard disk drive data is to be erased.

An apparatus capable of erasing data recorded on a magnetic disk while it is mounted in a hard disk drive is disclosed by Patent Document 1 (International Publication No. WO98/49674). This apparatus includes two upper permanent magnets, which are positioned adjacent to each other to attract each other, and two lower permanent magnets, which are positioned adjacent to each other to attract each other. The permanent magnet surfaces that vertically face each other have the same polarity.

When the magnetic disk rotates within a magnetic field, the magnetic field parallel to the entire magnetic disk surface works so as to erase the data. An external magnetic field, which is generated by the permanent magnets, makes it possible to rapidly erase the data from the magnetic disk. However, this method requires an apparatus that rotates the magnetic disk. Further, if the spindle motor for the hard disk drive whose data is to be erased is defective, the magnetic disk cannot be rotated. If the magnetic disk is rotated by a rotation mechanism for a data erasure apparatus and without using the spindle motor of the hard disk drive, the number of steps to be performed increases to the detriment of efficiency (e.g., it is necessary to perform the steps for removing the hard disk drive top cover and removing the magnetic disk from the hard disk drive).

An apparatus for erasing data from a magnetic disk without rotating it is disclosed by Patent Document 2 (Japanese Patent JP-A No. 110908/2004). This apparatus moves a hard disk drive relatively in relation to a data erasure permanent magnet. Data erasure is achieved by moving the magnetic disk of the hard disk drive in such a manner that the entire surface of the magnetic disk passes over the permanent magnet.

BRIEF SUMMARY OF THE INVENTION

To erase data recorded on a magnetic disk, it is necessary to apply to the magnetic disk a magnetic field that is stronger than the coercive force of the magnetic disk. In recent years, the recording density of the magnetic disk has remarkably increased so that the coercive force of the magnetic disk has increased as well. Therefore, increased magnetic field strength is required for erasing data recorded on the magnetic disk.

Further, a wide variety of hard disk drive types and materials are used recently. Therefore, the optimum conditions for data erasure may vary depending on the hard disk drive whose data is to be erased. If an attempt is made to erase data under the same operating conditions, incomplete data erasure or avoidable processing time increase may result.

The present invention has been made in view of the above circumstances. It is a feature of the present invention to erase data recorded on a magnetic disk with increased certainty by making use of an external magnetic field.

According to a first aspect of the present invention, there is provided a method for erasing data recorded on a magnetic disk, which is housed in a magnetic disk drive, by using an external erasure magnetic field generated by an external erasure magnetic field generator, the method comprising the steps of: moving a first magnetic disk drive within an external erasure magnetic field in a moving state appropriate for the type of the first magnetic disk drive, and erasing data recorded on a magnetic disk in the first magnetic disk drive; and moving a second magnetic disk drive, which differs in type from the first magnetic disk drive, within an external erasure magnetic field in a moving state that differs from the moving state of the first magnetic disk drive, and erasing data recorded on a magnetic disk in the second magnetic disk drive. When the status of hard disk drive movement within the external erasure magnetic field is changed in accordance with the type of the hard disk drive targeted for erasure, the data recorded on the magnetic disk can be erased with increased certainty.

It is preferred that the first magnetic disk drive include a predetermined component that is made of a nonconductor, and that the second magnetic disk drive include a predetermined component that is made of a conductor, and further that the second magnetic disk drive move within the external erasure magnetic field at a lower speed than the first magnetic disk drive. The generation of an eddy current in the external erasure magnetic field is then reduced so that magnetic disk data erasure can be achieved with increased certainty. The aforementioned predetermined component may be a circuit board for the magnetic disk.

It is preferred that the first magnetic disk drive include a ferromagnetic housing, and that the second magnetic disk drive include a nonferromagnetic housing. It is also preferred that the first magnetic disk drive move within the external erasure magnetic field while the direction of the external erasure magnetic field is inclined from the recorded magnetization direction of a magnetic disk, and that the second magnetic disk drive move within the external erasure magnetic field while the direction of the external erasure magnetic field is parallel to the recorded magnetization direction of a magnetic disk. This ensures that the external erasure magnetic field works on the magnetic disk with increased efficiency.

It is preferred that the first magnetic disk drive include a magnetic disk whose diameter is not greater than the width of the external erasure magnetic field, and that the second magnetic disk drive include a magnetic disk whose diameter is greater than the width of the external erasure magnetic field. It is also preferred that the first magnetic disk drive move unidirectionally, thereby causing the entire magnetic disk of the first magnetic disk drive to pass within the external erasure magnetic field. Further, it is additionally preferred that the second magnetic disk drive move in a first direction so that a part of the magnetic disk of the second magnetic disk drive passes within the external erasure magnetic field, move in a direction crossing the first direction, and then move so that a part of the magnetic disk, which passed outside the external erasure magnetic field during the move in the first direction, passes within the external erasure magnetic field. The entire surface of the magnetic disk is then allowed to pass the external erasure magnetic field.

It is preferred that the first magnetic disk drive include a magnetic disk circuit board that is made of a nonconductor, and that the second magnetic disk drive include a magnetic disk circuit board that is made of a conductor, and further that the second magnetic disk drive move within the external erasure magnetic field at a lower speed than the first magnetic disk drive. The generation of an eddy current in the external erasure magnetic field is then reduced so that magnetic disk data erasure can be achieved with increased certainty.

According to a second aspect of the present invention, there is provided a method for erasing data recorded on a magnetic disk, which is housed in a magnetic disk drive, by using an external erasure magnetic field generated by an external erasure magnetic field generator, the method comprising the steps of: retaining the magnetic disk drive so that the direction of the external erasure magnetic field is inclined from the recorded magnetization direction of a magnetic disk; and moving the magnetic disk drive within the external erasure magnetic field while the direction of the external erasure magnetic field is inclined from the recorded magnetization direction of the magnetic disk, and erasing data recorded on the magnetic disk. The external erasure magnetic field then works on the magnetic disk with increased efficiency so that the data recorded on the magnetic disk can be erased with increased certainty.

It is preferred that the magnetic disk drive move in a plane along the direction of the external erasure magnetic field to erase data recorded on the magnetic disk. This ensures that the external erasure magnetic field works on the magnetic disk with increased certainty.

It is preferred that a magnetic disk drive having a ferromagnetic housing move within the external erasure magnetic field while the direction of the external erasure magnetic field is inclined from the recorded magnetization direction of a magnetic disk in the magnetic disk drive, and that a magnetic disk drive having a nonferromagnetic housing move within the external erasure magnetic field while the recorded magnetization direction of a magnetic disk in the magnetic disk drive is parallel to the direction of the external erasure magnetic field. This ensures that the external erasure magnetic field works on the magnetic disk with increased efficiency. Consequently, even when the magnetic field is interfered with by the ferromagnetic housing, the data recorded on the magnetic disk can be erased with certainty.

According to a third aspect of the present invention, there is provided a data erasure apparatus for erasing data recorded on a magnetic disk, which is housed in a magnetic disk drive, by using an external erasure magnetic field, the data erasure apparatus comprising: an external erasure magnetic field generator for generating an external erasure magnetic field; a retention/movement mechanism for retaining the magnetic disk drive and moving the magnetic disk drive within the external erasure magnetic field; and a controller for operating the retention/movement mechanism under conditions appropriate for the type of the magnetic disk from which data is to be erased. When the status of hard disk drive movement within the external erasure magnetic field is changed in accordance with the type of the hard disk drive targeted for erasure, the data recorded on the magnetic disk can be erased with increased certainty.

It is preferred that the controller control the retention/movement mechanism so that a magnetic disk drive having a magnetic disk made of a conductor moves within the external erasure magnetic field at a lower speed than a magnetic disk drive having a magnetic disk made of a nonconductor. The generation of an eddy current in the external erasure magnetic field is then reduced so that magnetic disk data erasure can be achieved with increased certainty.

It is preferred that the retention/movement mechanism retain a magnetic disk drive having a ferromagnetic housing so that the direction of the external erasure magnetic field is inclined from the recording surface of a magnetic disk in the magnetic disk drive, and move the magnetic disk drive within the external erasure magnetic field while the direction of the external erasure magnetic field is inclined from the recording surface of the magnetic disk. This ensures that the external erasure magnetic field works on the magnetic disk with increased efficiency.

It is preferred that the retention/movement mechanism unidirectionally move a magnetic disk drive whose magnetic disk diameter is not greater than the width of the external erasure magnetic field so that a magnetic disk in the magnetic disk drive entirely passes within the external erasure magnetic field. It is also preferred that the retention/movement mechanism move a magnetic disk drive whose magnetic disk diameter is greater than the width of the external erasure magnetic field in a first direction so that a part of a magnetic disk in the magnetic disk drive passes within the external erasure magnetic field, move the magnetic disk drive in a direction crossing the first direction, and then move the magnetic disk drive in a direction opposite to the first direction so that a part of the magnetic disk, which passed outside the external erasure magnetic field during the move in the first direction, passes within the external erasure magnetic field. The entire surface of the magnetic disk is then allowed to pass the external erasure magnetic field.

It is preferred that the controller control the retention/movement mechanism so that a magnetic disk drive having a magnetic disk made of a conductor moves within the external erasure magnetic field at a lower speed than a magnetic disk drive having a magnetic disk made of a nonconductor. The generation of an eddy current in the external erasure magnetic field is then reduced so that magnetic disk data erasure can be achieved with increased certainty.

The present invention makes it possible to erase data recorded on a magnetic disk with increased certainty by making use of an external magnetic field.

DETAILED DESCRIPTION OF THE INVENTION

Figure 1:
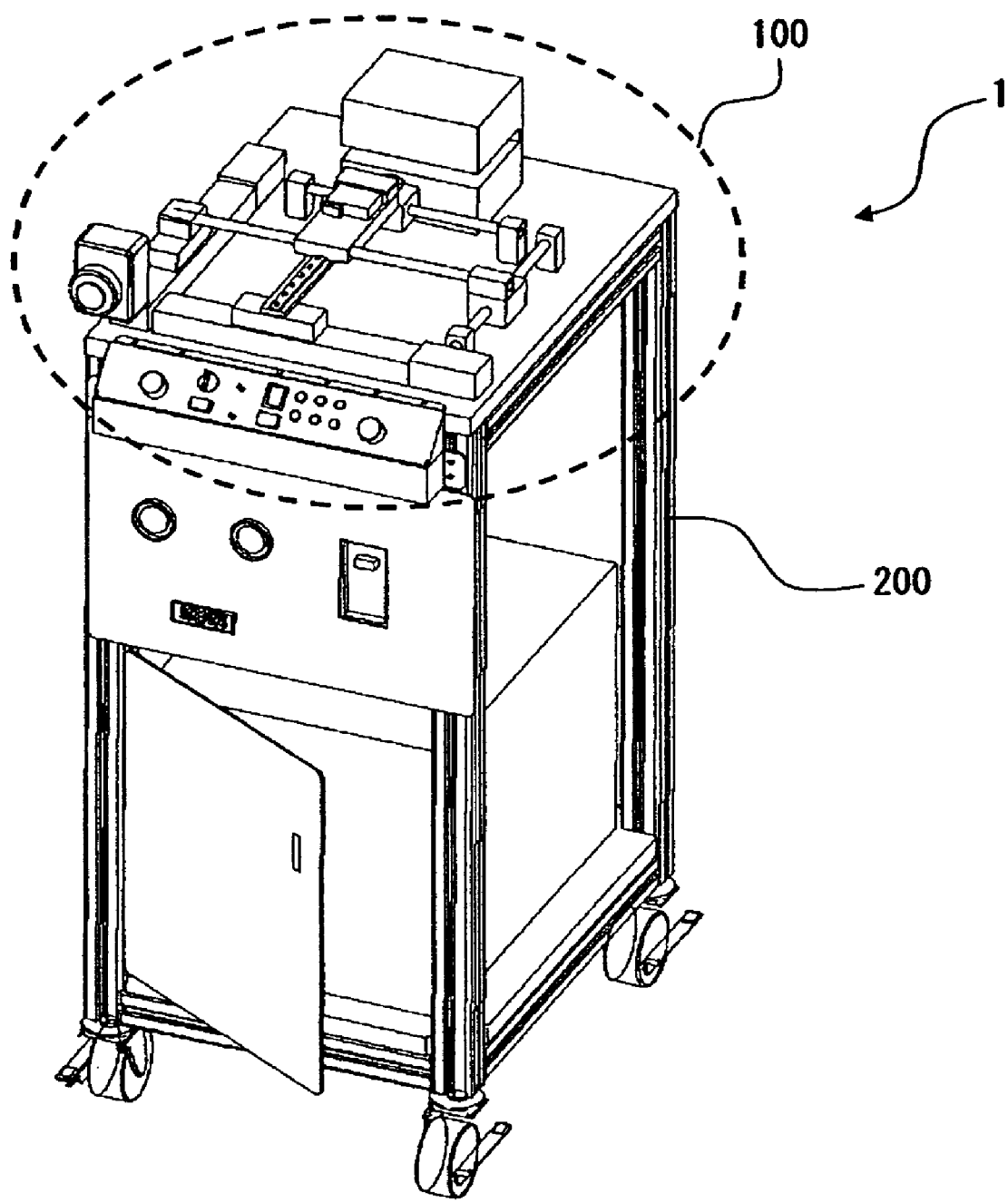
FIG. 1 is a perspective overall view illustrating a data erasure apparatus.

Embodiments of the present invention will now be described. For purposes of clarity, the following description and the accompanying drawings are abbreviated or simplified as appropriate. Further, like elements in the drawings are designated by like reference numerals and will not be described repeatedly. FIG. 1 is a perspective overall view illustrating a data erasure apparatus 1 according to an embodiment of the present invention. The data erasure apparatus 1 includes a functional section 100 and a base frame 200.

Figure 2:
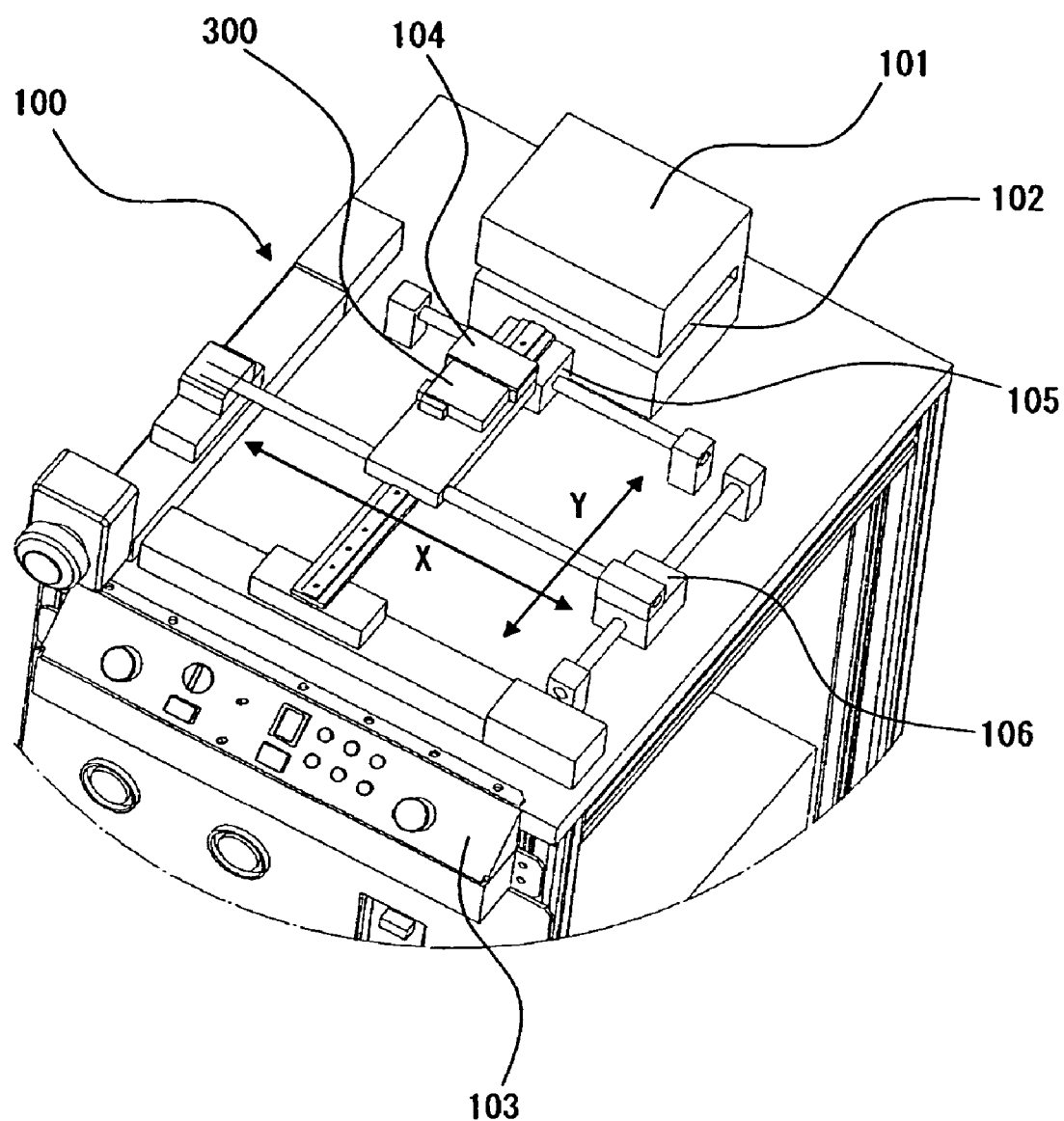
FIG. 2 is a perspective view illustrating a functional section of the data erasure apparatus.

FIG. 2 is an enlarged perspective view illustrating the functional section 100 of the data erasure apparatus 1. The functional section 100 includes a magnetism circuit 101. The magnetism circuit 101 is a typical external erasure magnetic field generator, which generates an external erasure magnetic field for erasing data recorded on a magnetic disk drive (hereinafter referred to as the "hard disk drive"). The magnetism circuit 101 generates a magnetic field within a magnetic field generation space 102. The functional section 100 also includes a controller 103, a hard disk drive retainer 104 for mounting and retaining a hard disk drive 300 that is targeted for data erasure, an X-axis movement section 105 for moving the hard disk drive retainer 104 in the X-axis direction as indicated in the figure, and a Y-axis movement section 106 for moving the hard disk drive retainer 104 in the Y-axis direction as indicated in the figure. The hard disk drive retainer 104 can pivot in the X-axis direction, which is indicated in the figure. The subsequent description assumes that the hard disk drive 300 includes a magnetic disk for horizontal magnetic recording.

The controller 103 drives the hard disk drive retainer 104, X-axis movement section 105, and Y-axis movement section 106 in accordance with input information. The controller 103 also stores, for instance, the information necessary for operating the data erasure apparatus 1 and the serial number of a hard disk drive from which data is erased. Only a power source is required for operating the data erasure apparatus 1. The data erasure apparatus 1 can be operated at any place where a power source is available.

Figure 3:
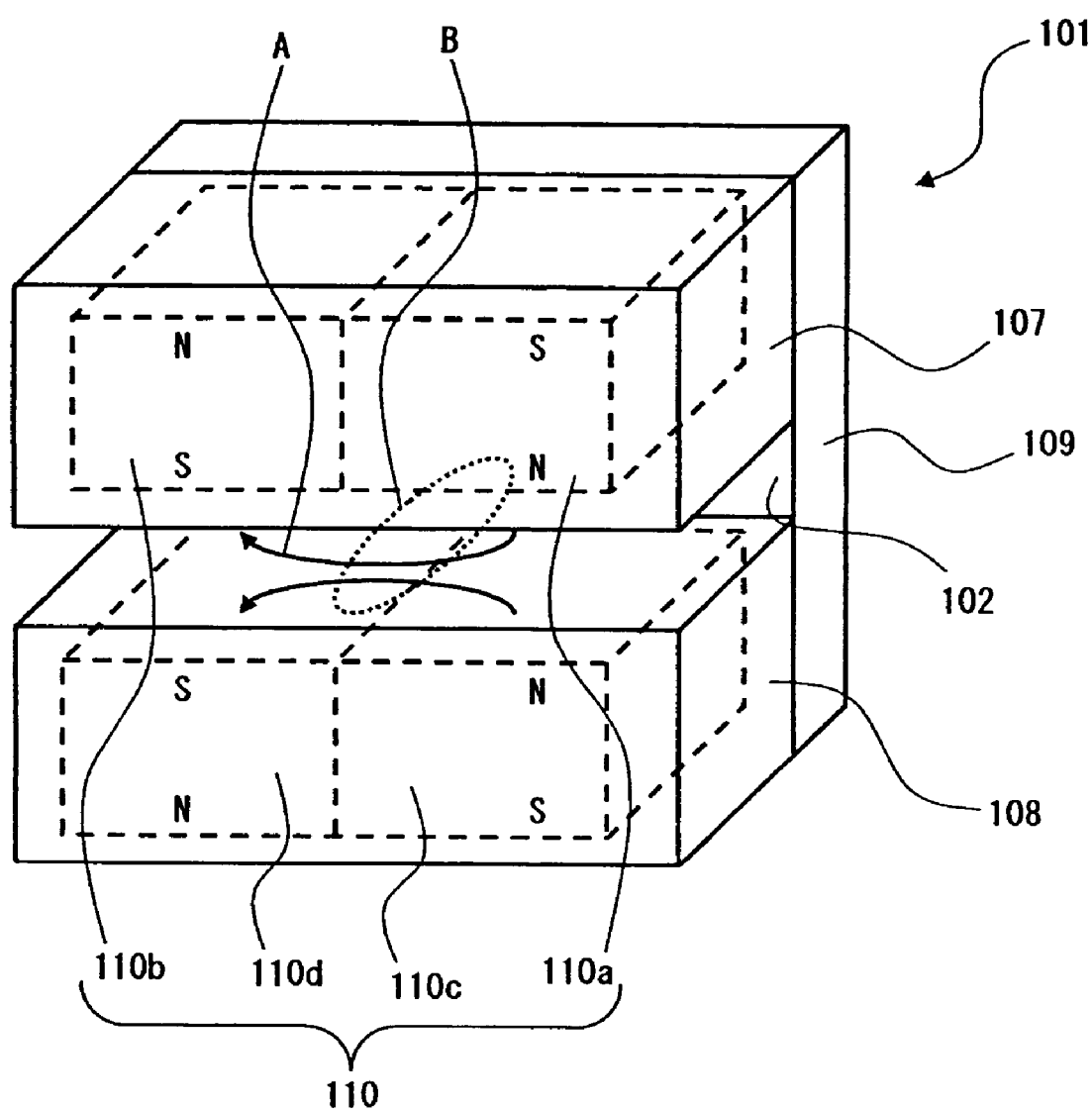
FIG. 3 is a perspective view illustrating the configuration of a magnetism circuit.

Various parts of the functional section 100 will now be described in detail. FIG. 3 is a perspective view illustrating the details of the magnetism circuit 101. As indicated in the figure, the magnetism circuit 101 includes an upper housing 107, a lower housing 108, and a junction section 109. The junction section 109 retains one end each of the upper housing 107 and lower housing 108 in such a manner that a gap is provided between the two housings. The resulting space between the upper housing 107 and lower housing 108 serves as the magnetic field generation space 102. In other words, the magnetism circuit 101 is shaped like the letter U so that the space enclosed within the letter U serves as the magnetic field generation space 102.

The upper housing 107 and lower housing 108 are rectangular parallelepipeds or cubes containing a permanent magnet 110. The junction section 109 is a plate-like member or a member shaped like a parallelepiped. The upper housing 107 and lower housing 108 are positioned so that one surface of the upper housing 107 is opposed to and parallel to one surface of the lower housing 108. The space enclosed by the upper housing 107, lower housing 108, and junction section 109 serves as the magnetic field generation space 102. The magnetism of a magnetic field that is generated in the magnetic field generation space 102 erases the data stored on the hard disk drive 300. A set of two permanent magnets 110 are positioned in each of the upper housing 107 and lower housing 108. The upper housing 107 contains permanent magnets 110a and 110b, whereas the lower housing 108 contains permanent magnets 110c and 110d.

Permanent magnets 110a and 110b are positioned within the upper housing 107 and coupled in a direction from one side to the other side of the U-shaped lateral surface of the magnetism circuit 101. In other words, permanent magnets 110a and 110b are parallel to the surface of the junction section 109 and coupled in a direction parallel to a plane that the upper housing 107 and magnetic field generation space 102 faces. Permanent magnets 110c and 110d are positioned within the lower housing 108 and coupled in a direction from one side to the other side of the U-shaped lateral surface of the magnetism circuit 101. Therefore, permanent magnets 110a and 110c face each other with the magnetic field generation space 102 positioned between them. Further, permanent magnets 110b and 110d face each other with the magnetic field generation space 102 positioned between them.

A set of the permanent magnets 110 are positioned adjacent to each other so that they attract each other. More specifically, permanent magnets 110a and 110b are positioned so that the N-pole of permanent magnet 110a faces in the same direction as the S-pole of permanent magnet 110b. Similarly, permanent magnets 110c and 110d are positioned so that the N-pole of permanent magnet 110c faces in the same direction as the S-pole of permanent magnet 110d. In the vicinity of a set of permanent magnets 110, therefore, a magnetic field is formed. This magnetic field is directed from the N-pole of one permanent magnet to the S-pole of the other permanent magnet.

The permanent magnets 110 contained in the upper housing 107 and the permanent magnets 110 contained in the lower housing 108 are positioned so that the same polarities face each other. More specifically, the same polarities of permanent magnets 110a and 110c face each other with the magnetic field generation space 102 positioned between them. Further, the same polarities of permanent magnets 110b and 110d face each other with the magnetic field generation space 102 positioned between them. As indicated in FIG. 3, the present embodiment is such that the N-pole of permanent magnet 110a faces the N-pole of permanent magnet 110c with the magnetic field generation space 102 sandwiched between them. Similarly, the S-pole of permanent magnet 110b faces the S-pole of permanent magnet 110d with the magnetic field generation space 102 sandwiched between them.

As the permanent magnets 110 are positioned as described above, magnetic fields are formed in the magnetic field generation space 102. As indicated in FIG. 3, the magnetic fields are oriented in the direction of arrow A. One of the magnetic fields, which are formed in the magnetic field generation space 102, is directed from the N-pole of permanent magnet 110a to the S-pole of permanent magnet 110b. The other magnetic field is directed from the N-pole of permanent magnet 110c to the S-pole of permanent magnet 110d.

An erasure achievement area B, in which an erasure magnetic field is generated, is near an intermediate point among permanent magnets 110a, 110b, 110c, and 110d, near an intermediate point between permanent magnets 110a and 110b and within the magnetic field generation space 102, and near an intermediate point between permanent magnets 110c and 110d and within the magnetic field generation space 102. Therefore, the erasure achievement area B is a longitudinal area, which is perpendicular to the surface of the junction section 109 that is exposed to the magnetic field generation space 102 (see FIGS. 5(a) to 5(d)). Within the magnetic field generation space 102, the magnetic field strength in the erasure achievement area B is greater than the coercive force of the magnetic disk targeted for data erasure. In the erasure achievement area B, a magnetic field is formed in a direction parallel to the surfaces of the junction section 109, upper housing 107, and lower housing 108 that are exposed to the magnetic field generation space 102.

In a plane parallel to each surface that the upper housing 107 and lower housing 108 face, the term "Y-axis" refers to a direction perpendicular to a plane that the junction section 109 and magnetic field generation space 102 face, whereas the term "X-axis" refers to a direction parallel to a plane that the junction section 109 and magnetic field generation space 102 face. In other words, in the upper housing 107 or lower housing 108, the X-axis refers to a direction in which a pair of permanent magnets 110 are coupled, whereas the Y-axis is an axis perpendicular to the X-axis in a plane parallel to the magnetic pole piece surface of permanent magnets 110.

The controller 103 drives the hard disk drive retainer 104, X-axis movement section 105, and Y-axis movement section 106 in accordance with operator-entered information. Further, the controller 103 includes an interface for allowing the operator to enter information. The information input into the controller 103 includes the information about the hard disk drive 300, such as the information about magnetic disk materials, hard disk drive housing materials, and hard disk drive disk size. Furthermore, the controller 103 includes a memory for information storage.

In addition, the controller 103 has a barcode reading function. The information read from a barcode that is attached to the hard disk drive 300 is stored to record the hard disk drive 300 on which a data erasure process has been performed. The information read from the barcode includes a serial number of the hard disk drive 300. Moreover, the operator can operate the hard disk drive retainer 104, X-axis movement section 105, and Y-axis movement section 106 via the controller 103.

The hard disk drive retainer 104 is a support for retaining the hard disk drive 300. It includes a mounting plate (not shown) for mounting the hard disk drive 300, and a retainer (not shown) for retaining the hard disk drive 300. The hard disk drive retainer 104 can retain hard disk drives of various sizes. The hard disk drive 300 targeted for data erasure includes ferromagnets or magnets such as a voice coil motor and spindle motor. Within the magnetic field generation space 102, therefore, the hard disk drive 300 receives attractive force or repulsive force depending on the magnetic field. Since such force is applied to the hard disk drive 300, the hard disk drive retainer 104 retains the hard disk drive 300 with an adequate force to prevent the retained hard disk drive 300 from being separated from the hard disk drive retainer 104. The hard disk drive retainer 104 is made of a nonferromagnetic, nonmetal substance in consideration of the influence upon the data erasure magnetic field.

The hard disk drive retainer 104 retains the hard disk drive 300 in such a manner that the hard disk drive 300 is positioned parallel to the mounting plate. Therefore, the magnetic field orientation of the erasure achievement area B within the magnetic field generation space 102 is parallel to the recording surface of the magnetic disk. In a typical hard disk drive for horizontal magnetic recording, the recorded magnetization direction is parallel to the magnetic field orientation. The hard disk drive 300 moves within the magnetic field generation space 102 in the above state and allows the external erasure magnetic field to work on the magnetic disk. This erases the data stored on the hard disk drive 300.

The hard disk drive retainer 104 is capable of inclining the hard disk drive 300, which is retained by the hard disk drive retainer 104, in an X-axis direction. This varies the angle between the retained hard disk drive 300 or the magnetic disk contained in the hard disk drive 300 and the erasure achievement area B. This inclination function is controlled by the controller 103. The details of the inclination function will be described later. The hard disk drive retainer 104 can move in a plane that is parallel to the plane that the upper housing 107 and lower housing 108 face. The X-axis movement section 105 and Y-axis movement section 106 include a drive section for acquiring driving force and a guide for maintaining the strength.

Figure 4:
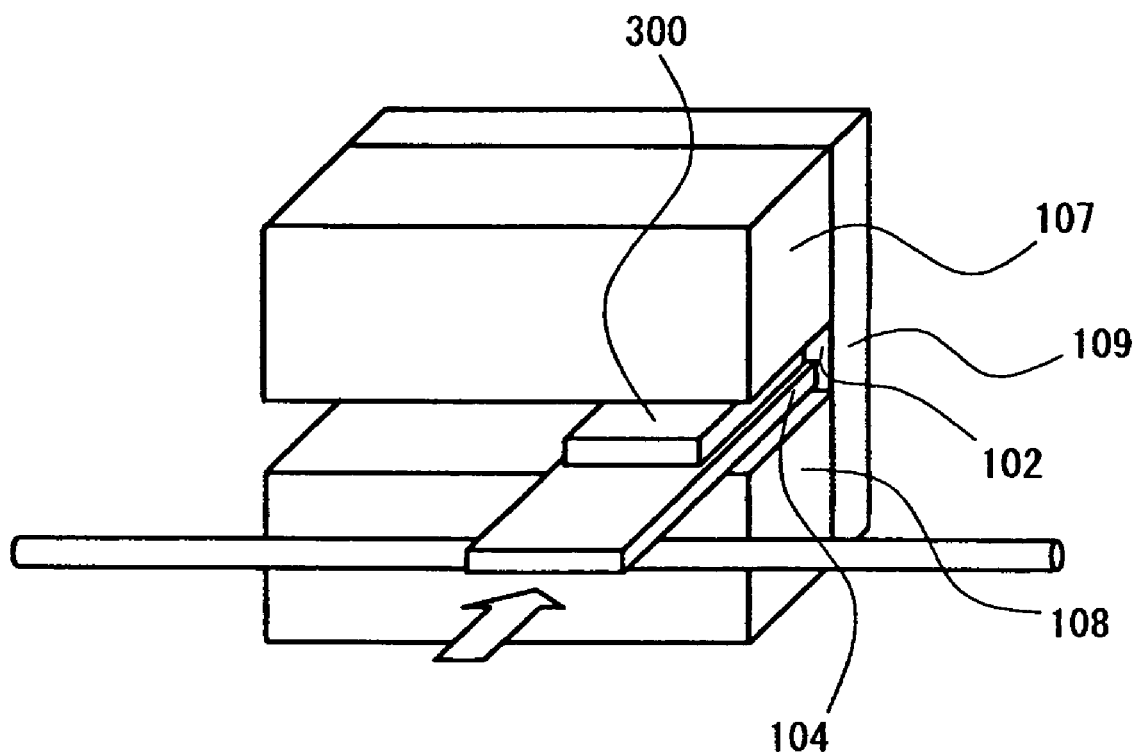
FIG. 4 is a perspective view illustrating a hard disk drive retainer and a hard disk drive that are inserted into the magnetism circuit.

As indicated in FIG. 4, the X-axis movement section 105 and Y-axis movement section 106 insert the hard disk drive 300 into the magnetic field generation space 102. In other words, the hard disk drive 300, which is secured to the hard disk drive retainer 104, is positioned between the upper housing 107 and lower housing 108. Subsequently, the controller 103 moves the hard disk drive retainer 104 within the erasure achievement area B. The external erasure magnetic field of the erasure achievement area B is then used to erase data recorded on a magnetic disk that is contained in the hard disk drive 300.

The operation performed by the data erasure apparatus according to the present embodiment will now be described in detail. The data erasure apparatus 1 according to the present invention erases data stored on the hard disk drive 300 by making use of an erasure magnetic field in the erasure achievement area B, which is generated within the magnetic field generation space 102. It is conceivable that the manner of magnetic field propagation may vary with the magnetic disk and housing materials of the hard disk drive 300. The path of hard disk drive movement in the magnetic field generation space 102 (erasure achievement area B) needs to be carefully determined depending on the size of the hard disk drive 300 so that the entire magnetic disk surface passes the erasure achievement area B.

The controller 103 stores beforehand the data erasure apparatus operating conditions, which vary with the type of the hard disk drive 300. When the data stored on the hard disk drive 300 is to be erased, the type identification information about the hard disk drive targeted for data erasure is entered into the controller 103. More specifically, the information about the disk size, housing materials, magnetic disk materials, and the like is entered. In accordance with the entered information, the controller 103 decides on a movement that is appropriate for the type of the hard disk drive 300. The hard disk drive 300 is then moved in accordance with the decision. Consequently, the data can be erased from the hard disk drive 300 properly and efficiently.

First of all, the operating conditions, which specify the movement path and vary with the disk size of the hard disk drive 300, will be described. Hard disk drives currently on the market are mainly of the 3.5-inch type, 2.5-inch type, 1.8-inch type, or 1-inch type. The 3.5-inch type will be first explained with reference to FIGS. 5(a) to 5(d). FIGS. 5(a) to 5(d) are top views illustrating the hard disk drive 300 that is inserted into the magnetism circuit 101. For purposes of clarity and understanding, the upper housing 107 and hard disk drive retainer 104 are excluded from FIGS. 5(a) to 5(d). The length of the erasure achievement area B in the magnetism circuit 101 is smaller than the diameter of a magnetic disk 301 that is contained in the hard disk drive 300 targeted for data erasure.

Figure 5:
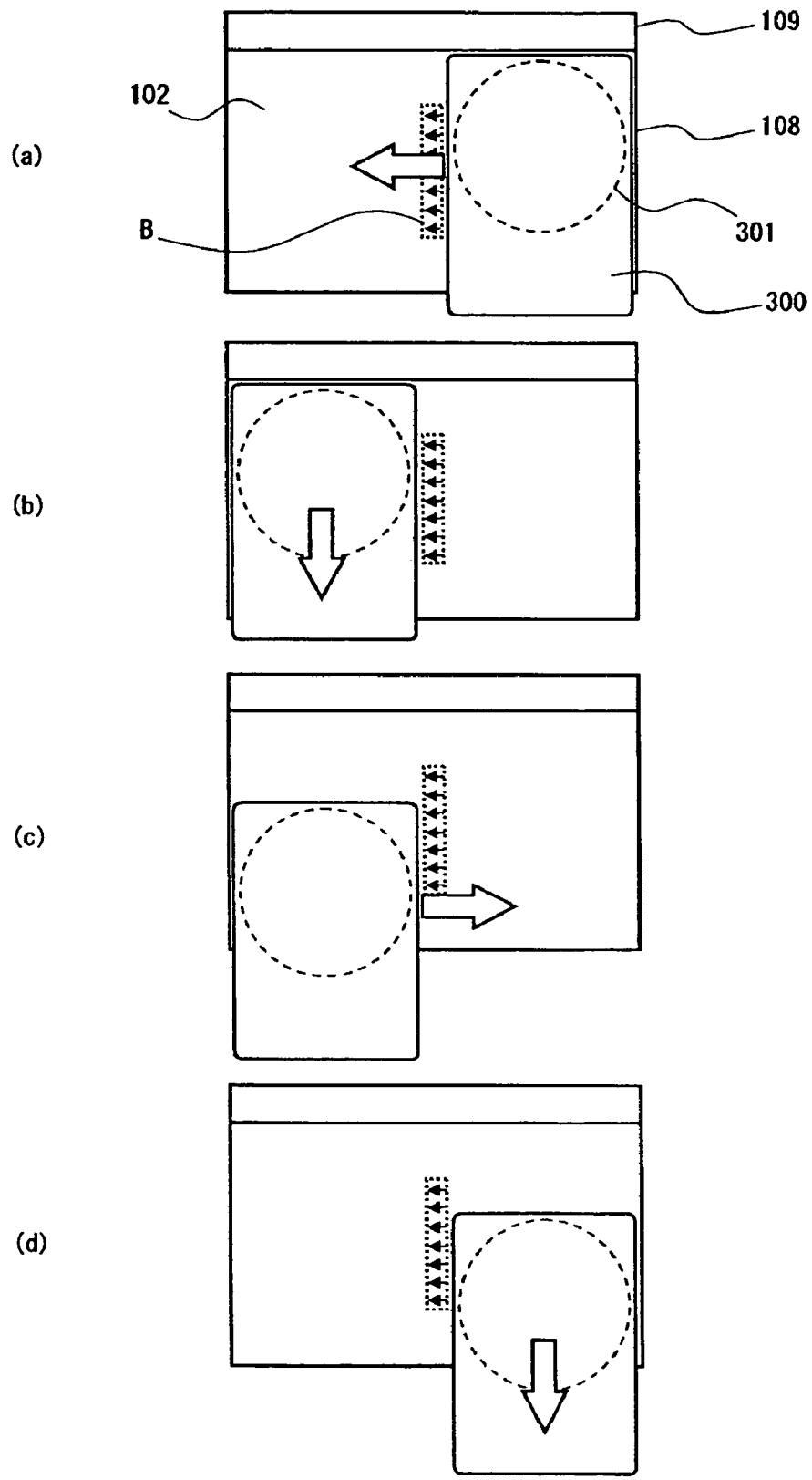
FIGS. 5(a) to 5(d) are top views illustrating the relative movement of the hard disk drive in relation to the magnetism circuit.

The hard disk drive 300, which is secured to the hard disk drive retainer 104, is inserted into the magnetic field generation space 102 in such a manner that the magnetic disk 301 is positioned toward the junction section 109 as indicated in FIG. 5(a). The hard disk drive retainer 104 is positioned close to the junction section 109 but not brought into contact with the junction section 109. In this instance, at least the semicircle of the magnetic disk 301 that is positioned opposite the junction section 109 is contained in the erasure achievement area B in the Y-axis direction. In other words, the length of the erasure achievement area B is not smaller than the radius of the magnetic disk 301.

In the resulting state, the controller 103 drives the X-axis movement section 105 to move the hard disk drive 300 in the direction of a white arrow in FIG. 5(a), that is, in a direction parallel to the magnetic field direction of the erasure achievement area B. When the hard disk drive 300 moves in the magnetic field generation space 102 as described above from one side to the other side of the U-shaped lateral surface of the magnetism circuit 101, at least the lower half of the magnetic disk 301, which is shown in the figure, that is, the semicircle positioned opposite the junction section 109, passes the erasure achievement area B. This erases at least the data that is stored on the magnetic disk 301 and has passed the erasure achievement area B.

More specifically, when the magnetic disk 301 passes the erasure achievement area B, a magnetic field, which is oriented in the direction of black arrows in the figure, is applied to a magnetic layer of the magnetic disk 301. In other words, the magnetic field of the erasure achievement area B is applied to the magnetic layer of the magnetic disk 301 in a direction parallel to the recording surface of the magnetic disk 301. The magnetic layer of the magnetic disk 301 is then magnetized in the direction of the arrows in the figure, that is, in the same direction as that of the magnetic field in the erasure achievement area B.

Next, when the Y-axis movement section 106 is driven as indicated in FIG. 5(b), the hard disk drive 300 moves away from the junction section 109. The portion of the magnetic disk that has passed the outside of the erasure achievement area B, that is, the semicircle of the magnetic disk that is positioned on the side toward the junction section 109, is then placed within the erasure achievement area B in the Y-axis direction.

When the X-axis movement section 105 is driven in the resulting state as indicated in FIG. 5(c), the hard disk drive 300 moves in the direction of a white arrow in the figure. In other words, the hard disk drive retainer 104 moves from one side to the other side of the U-shaped lateral surface of the magnetism circuit 101 and in a direction opposite to the direction indicated in FIG. 5(a). The portion of the magnetic disk 301 that did not pass the erasure achievement area B in a process shown in FIG. 5(a) passes the erasure achievement area B so that the data stored on that portion is erased.

Finally, when the Y-axis movement section 106 is driven as indicated in FIG. 5(d), the hard disk drive retainer 104 moves away from the junction section 109 so that the hard disk drive 300 comes out of the magnetic field generation space 102. When the diameter of the magnetic disk 301 contained in the hard disk drive 300 is greater than the length of the erasure achievement area B as described above, the Y-axis movement section 106 is driven between the outward path and homeward path to change the magnetic disk position relative to the erasure achievement area B so that the entire surface of the magnetic disk 301 passes the erasure achievement area B. This ensures that the entire data stored on the magnetic disk 301 can be erased without driving the spindle motor in the hard disk drive 300 to rotate the magnetic disk 301.

Figure 6:
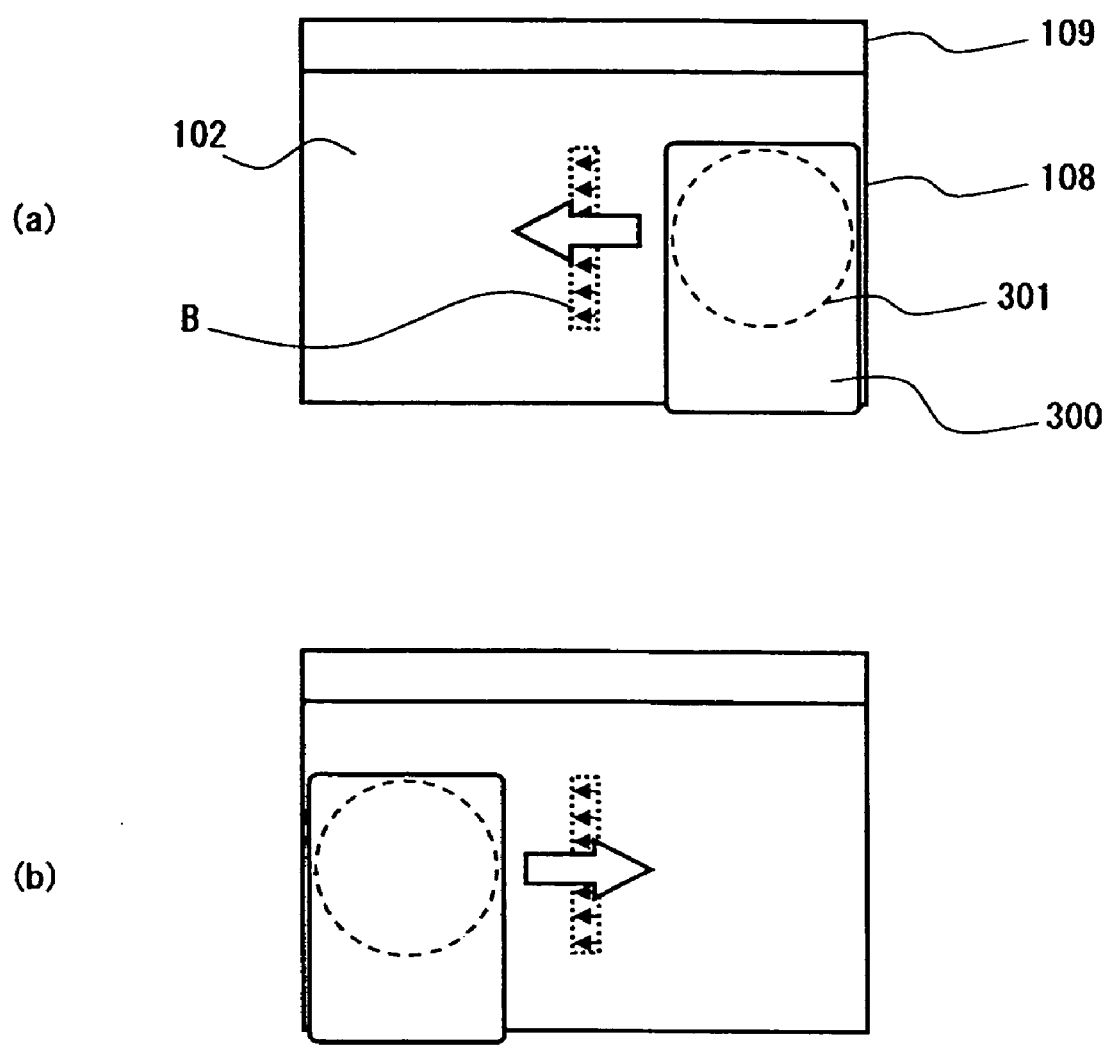
FIGS. 6(a) and 6(b) are top views illustrating the relative movement of the hard disk drive in relation to the magnetism circuit.

The 2.5-inch, 1.8-inch, and 1-inch types will now be explained. FIGS. 6(a) and 6(b) show a 2.5-inch hard disk drive as an example. In the example shown in the figures, the diameter of the magnetic disk 301 contained in the 2.5-inch hard disk drive is not greater than the width of the erasure achievement area B in the Y-axis direction. In other words, the diameter of the magnetic disk 301 is smaller than the length of the erasure achievement area B. In this situation, the Y-axis movement section 106 need not be driven between the outward path and homeward path of the hard disk drive 300 as indicated in FIGS. 5(a) to 5(d).

More specifically, the X-axis movement section 105 and Y-axis movement section 106 are driven as indicated in FIG. 6(a) to position the hard disk drive 300 so that the magnetic disk 301 is placed in the erasure achievement area B in the Y-axis direction. In the resulting state, the X-axis movement section 106 is driven to move the hard disk drive 300 from right to left as indicated by a white arrow in the figure. In other words, the hard disk drive 300 moves within the magnetic field generation space 102 from one side to the other side of the U-shaped lateral surface of the magnetism circuit 101.

The entire surface of the magnetic disk 301 then passes the erasure achievement area B. Consequently, the data stored on the magnetic disk 301 is erased. Next, the X-axis movement section 105 is driven again to move the hard disk drive 300 from left to right as indicated by a white arrow in FIG. 6(b). This ensures that the data stored on the magnetic disk 301 is erased with increased certainty. As regards 1.8-inch and 1-inch hard disk drives, too, the stored data can be erased in the same manner as described above when the hard disk drive 300 reciprocates, thereby allowing the magnetic disk 301 to pass the erasure achievement area B, as indicated in FIGS. 6(a) and 6(b). An alternative is to let the hard disk drive 300 pass the erasure achievement area B only once.

The manner of moving the hard disk drive 300 for data erasure, which is indicated in FIGS. 5(a) to 5(d) and FIGS. 6(a) and 6(b), is determined by the relative sizes of the hard disk drive 300 targeted for data erasure, magnetism circuit 101, and erasure achievement area B. FIGS. 5(a) to 5(d) relate to a situation where the diameter of the magnetic disk 301 is greater than the length of the erasure achievement area B (the length in a direction perpendicular to the direction of movement). FIGS. 6(a) and 6(b) relate to a situation where the diameter of the magnetic disk 301 is smaller than the length of the erasure achievement area B.

To allow the entire surface of the magnetic disk 301 to pass the erasure achievement area B in a situation where, for instance, the diameter of the magnetic disk 301 is greater than two times the length of the erasure achievement area B and smaller than three times the length of the erasure achievement area B, the hard disk drive retainer 104 is driven so that three divisions of the magnetic disk 301 respectively pass the erasure achievement area B while using the outward path in the magnetic field generation space 102 twice and using the homeward path once. The diameter of the magnetic disk 301 can be greater than three times the length of the erasure achievement area B. In this situation, the hard disk drive retainer 104 should be driven to reciprocate the magnetic disk 301 at least two times within the magnetic field generation space 102 so that the entire surface of the magnetic disk 301 passes the erasure achievement area B.

When the hard disk drive retainer 104 and hard disk drive 300 are positioned nearest the junction section 109 with the magnetic disk 301 positioned toward the junction section 109 as indicated in FIG. 5(a), it is preferred that the interval between the junction section 109 and the point on the circumference of the magnetic disk 301 that is farthest from the junction section 109 be smaller than the interval between the junction section 109 and the end of the erasure achievement area B that is far from the junction section 109. The reason is that if the above condition is not met, the entire surface of the magnetic disk 301 cannot pass the erasure achievement area B unless the magnetic disk 301 or hard disk drive 300 rotates.

The movement of the hard disk drive 300 varies with the material of the magnetic disk 301 contained in the hard disk drive 300. This movement variation will now be described. At present, the magnetic disk is made of a nonmagnetic conductor (nonferromagnet) such as a glass substrate or aluminum substrate. When a nonmagnetic metal passes a magnetic field, an eddy current is generated to disturb the magnetic field. Therefore, the erasure magnetic field in the erasure achievement area B is also affected so that the magnetic force working on the magnetic disk 301 decreases. Consequently, the data recorded on the magnetic disk 301 may be improperly erased.

To solve the above problem, the speed of hard disk drive movement in the magnetic field generation space 102 (erasure achievement area B) is varied in accordance with the material of the magnetic disk 301. The controller 103 exercises movement speed control in accordance with the information about the material of the magnetic disk 301, which is entered into the controller, and the previously stored information about movement, which varies with the material of the magnetic disk 301. The degree of eddy-current-induced magnetic field disturbance increases with an increase in the speed of passage in the magnetic field. Therefore, a magnetic disk 301 made of a conductor such as aluminum passes the erasure achievement area B at a lower speed than a magnetic disk made of a nonconductor such as a glass substrate. This reduces the degree of eddy-current-induced magnetic field disturbance. As a result, it is possible to avoid incomplete data erasure from the magnetic disk 301.

If, on the other hand, the magnetic disk 301 is made of a nonconductor such as a glass substrate, there is no need to consider the generation of an eddy current, which arises during magnetic disk passage in the magnetic field. Therefore, the magnetic disk 301 passes the erasure achievement area B at a higher speed than a magnetic disk made of a conductor from the viewpoint of throughput. In this case, too, the magnetic disk 301 needs to pass the erasure achievement area B at such a speed as to erase the data stored on the magnetic disk 301.

The movement speed of the hard disk drive 300, which varies with the material of the magnetic disk 301, will now be described in detail with reference to FIGS. 5(a) to 5(d) and FIGS. 6(a) and 6(b). The process to be considered in relation to the movement speed of the magnetic disk 301 is a process in which the magnetic disk 301 passes the erasure achievement area B. It means that the movement speed of the hard disk drive 300 should be controlled during the processes indicated in FIGS. 5(a) and 5(c) and FIGS. 6(a) and 6(b). More specifically, the intended purpose can be achieved by varying the relative speed of the hard disk drive retainer 104 in relation to the magnetism circuit 101 when the magnetic disk 301 passes the erasure achievement area B.

When the magnetic disk 301 is made of a nonmetal substance such as glass, it is not necessary to consider the generation of an eddy current. Therefore, the relative speed of the hard disk drive retainer 104 in relation to the magnetism circuit 101 should be such that the data on the magnetic disk 301 is erased when the hard disk drive retainer 104 passes the erasure achievement area B. For example, the hard disk drive retainer 104 should be driven at a speed between about 100 mm/s and 200 mm/s, and more preferably at a speed of about 150 mm/s. The same drive speed may be employed during the processes indicated in FIGS. 5(b) and 5(d).

When, on the other hand, the magnetic disk 301 is made of a metal, the relative speed of the hard disk drive retainer 104 is limited in relation to the magnetism circuit 101. The magnetic disk 301 may be made, for instance, of an aluminum substrate. The resulting speed is such that the data stored on the magnetic disk 301 is properly erased even when an eddy current disturbs the data erasure magnetic field within the erasure achievement area B. The speed at which the hard disk drive retainer 104 passes the magnetic field generation space 102 ensures that the strength of an eddy current generated due to magnetic disk movement is not greater than the aforementioned predetermined value. For example, the speed should be between about 25 mm/s and 75 mm/s, and more preferably about 50 mm/s.

The degree of eddy current generation decreases with a decrease in the movement speed of the magnetic disk 301. Therefore, the data recorded on the magnetic disk 301 can be properly erased when the movement speed of the magnetic disk 301 is lowered. It means, however, that data erasure takes an increased amount of time. Consequently, the number of units of the hard disk drive 300 that the data erasure apparatus 1 can process per unit time decreases, thereby degrading the throughput of the apparatus. It is therefore preferred that the relative speed at which the hard disk drive retainer 104 moves in relation to the magnetism circuit 101 be high to the extent that the data on the hard disk drive 300 is not incompletely erased due to eddy-current-induced magnetic field disturbance. The method described above can also be applied between a hard disk drive 300 having a conductive housing and a hard disk drive 300 having a nonconductive housing.

The drive conditions for the data erasure apparatus 1 change with the material of the housing used for the hard disk drive 300. Such drive condition changes will now be described. The magnetic field to be applied to the magnetic disk 301 greatly varies depending on whether the housing for the hard disk drive 300 is ferromagnetic or not. More specifically, when the housing materials for the hard disk drive's base, top cover, and the like are ferromagnetic, the shielding function of the magnetic material, which obstructs the magnetic field, works so that the data erasure magnetic field is blocked by the housing. Thus, the magnetic force working on the internal magnetic disk 301 becomes weak. In other words, a loss of magnetic force occurs in the data erasure magnetic field.

When data is to be erased from a hard disk drive having a ferromagnetic housing, the work efficiency of the data erasure magnetic field for the magnetic disk 301 needs to be increased to solve the above problem. When a magnetic field is to be applied to the magnetic disk 301 to adjust the magnetization array of the magnetic layer, the direction of magnetic field application should be inclined from the recorded magnetization direction of the magnetic disk because such will provide higher work efficiency of the magnetic field for the magnetic layer than when the direction of magnetic field application is parallel to the recorded magnetization direction of the magnetic disk.

Therefore, if the hard disk drive 300 has a ferromagnetic housing, the hard disk drive retainer 104 is driven in consideration of the resulting magnetic force loss of the data erasure magnetic field so that the hard disk drive 300 is inclined when it passes the magnetic field generation space 102. This increases the work efficiency of the data erasure magnetic field for the magnetic disk 301. Therefore, the data recorded on the magnetic disk 301 can be properly erased even when the hard disk drive 300 has a ferromagnetic housing.

Figure 7:
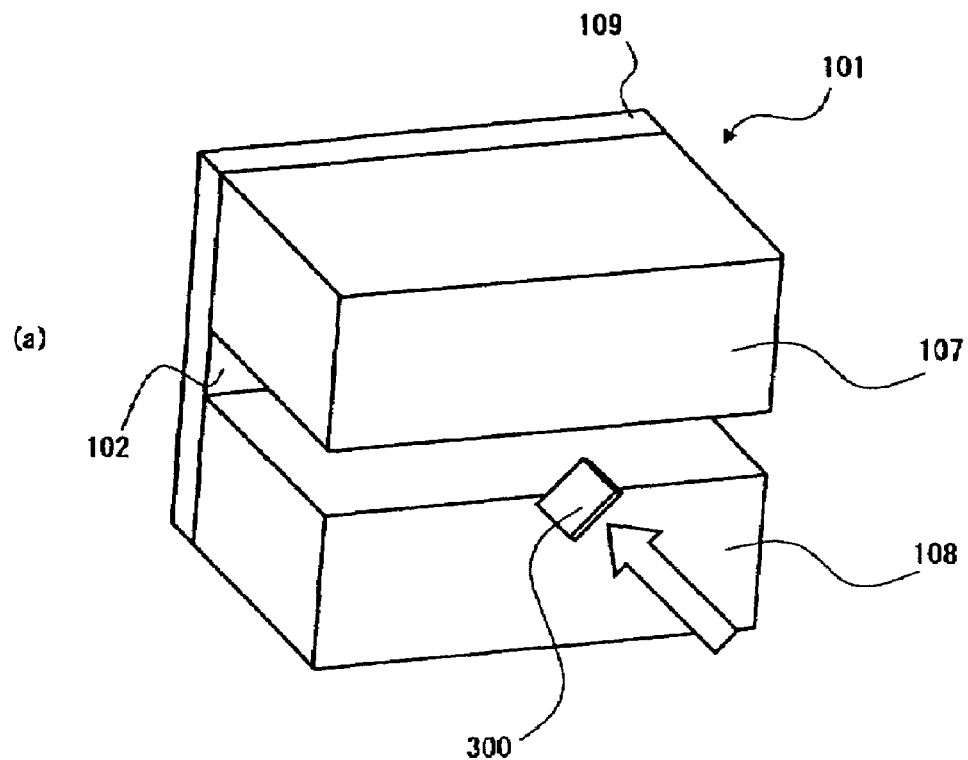
FIG. 7(a) is a perspective view illustrating the hard disk drive that is inclined when it is inserted into the magnetism circuit.
FIG. 7(b) is a front view illustrating the hard disk drive that is inclined when it is inserted into the magnetism circuit.
Figure 7:
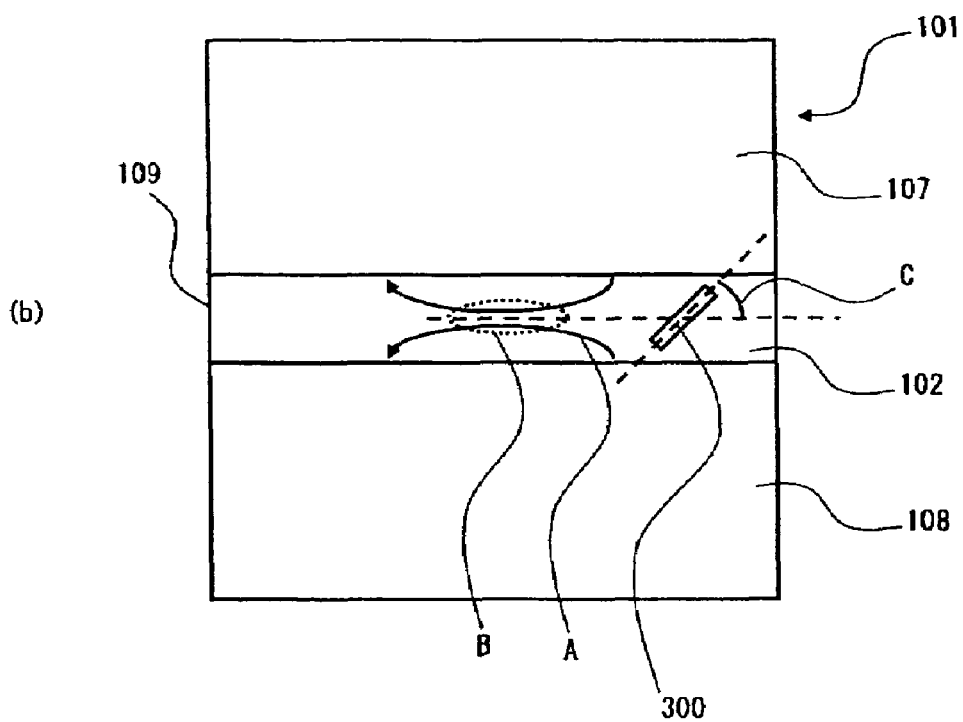

FIG. 7(a) is a perspective view in which the hard disk drive 300 is inclined when it is inserted into the magnetic field generation space 102. FIG. 7(b) is a front view that illustrates the same situation as FIG. 7(a). When the hard disk drive 300 has a ferromagnetic housing, it is inserted into the magnetic field generation space 102 while it is inclined as shown in FIG. 7(a). Further, the X-axis movement section 105 and Y-axis movement section 106 are driven as described with reference to FIGS. 5(a) to 5(d) and FIGS. 6(a) and 6(b) so that the entire surface of the magnetic disk 301 passes the erasure achievement area B.

More specifically, the hard disk drive 300 rotates on an axis that is perpendicular to the junction section surface exposed to the magnetic field generation space 102. In other words, the hard disk drive 300 rotates on the Y-axis. Further, the surface of the magnetic disk 301 contained in the hard disk drive 300 is inclined from the direction of the magnetic field in the erasure achievement area B. In other words, the hard disk drive 300 is inclined from the X-axis direction. In this instance, the angle formed between the line indicating the diameter of the magnetic disk 301, which is parallel to the X-axis, and the direction of the magnetic field in the erasure achievement area B (angle C in FIG. 7(b)) should be between about 30° and 60°, and more preferably about 45°. In other words, angle C is the angle formed between the surface of the magnetic disk 301 and a plane that the upper housing 107 or lower housing 108 and the magnetic field generation space 102 face.

The function of the hard disk drive retainer 104 is used to incline the hard disk drive 300. As described earlier, the hard disk drive retainer 104 is capable of inclining the hard disk drive 300, which is secured to the hard disk drive retainer 104, in the X-axis direction. This function can be exercised to incline the hard disk drive 300 as shown in FIGS. 7(a) and 7(b).

Upon receipt of information indicating that the hard disk drive 300 targeted for data erasure has a ferromagnetic housing, the controller 103 drives the hard disk drive retainer 104, and exercises control so that the hard disk drive 300, which is secured to the hard disk drive retainer 104, is inclined as described above. This control sequence may be performed by rotating the mounting plate of the hard disk drive retainer 104. Alternatively, the hard disk drive retainer 104 may incorporate a function for inclining the hard disk drive 300 from the mounting plate.

Figure 8:
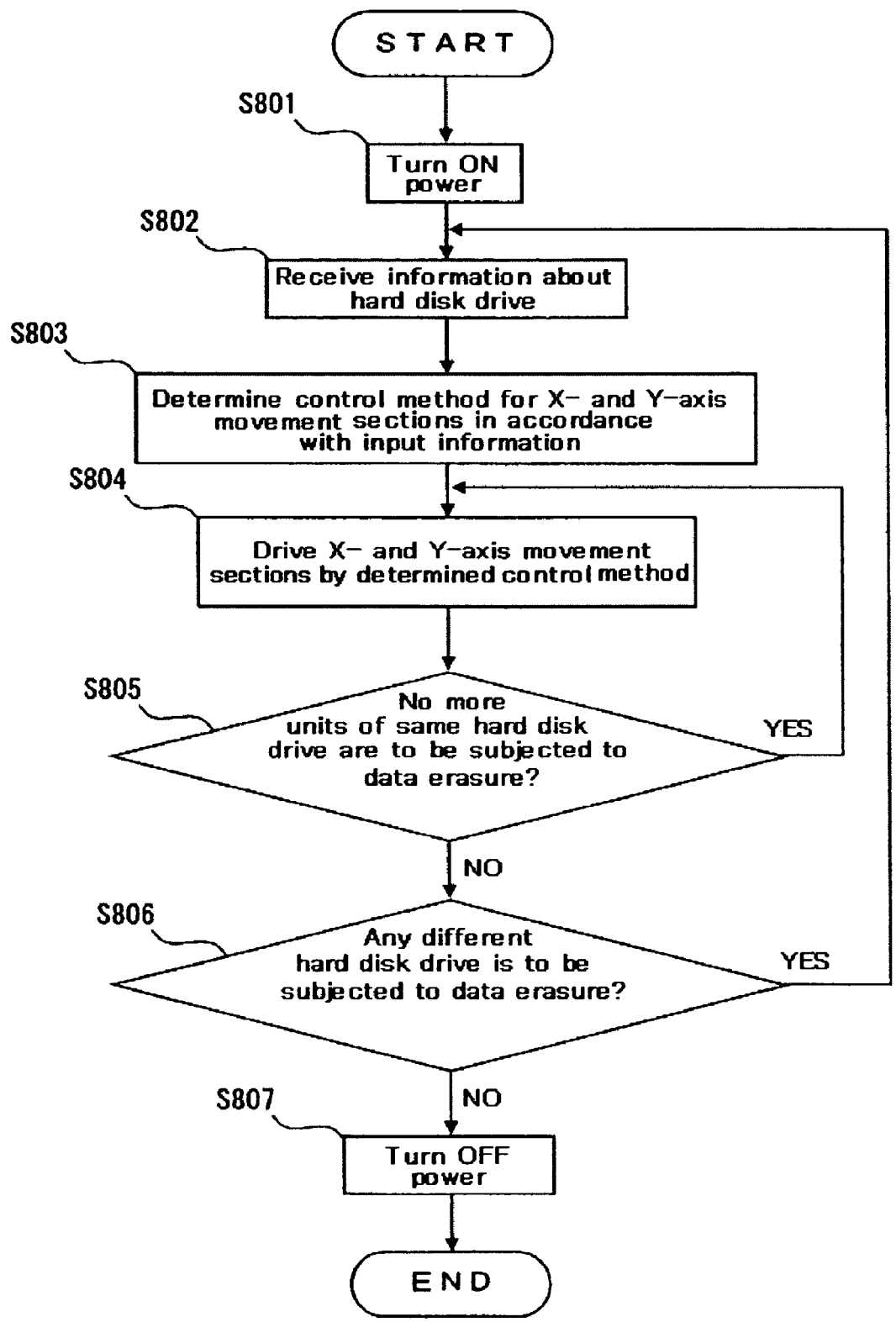
FIG. 8 is a flowchart illustrating how data is erased from the hard disk drive.

The overall operation performed by the data erasure apparatus 1 according to the present embodiment will now be described with reference to a flowchart in FIG. 8. First of all, the data erasure apparatus 1 is turned ON to initialize the apparatus (step S801). Next, the information about the hard disk drive 300 that is targeted for data erasure, including the information about the size of the hard disk drive and the materials of the housing and magnetic disk, is entered into the controller 103 (step S802). In accordance with the entered information, the controller 103 determines the method for controlling the X-axis movement section 105, Y-axis movement section 106, and hard disk drive retainer 104 (step S803). The X-axis movement section 105 and Y-axis movement section 106 are then driven in accordance with the determined control method (step S804).

When the data erasure sequence is completed for one hard disk drive 300, step S805 is performed to judge whether another unit of the same hard disk drive 300 is to be subjected to data erasure (i.e., to check for a hard disk drive whose data is to be erased under the same conditions as specified in a manner described above). The controller 103 may automatically formulate the above judgment. An alternative is to let the controller 103 formulate the above judgment in accordance with the information that is entered into the controller 103 by the operator. If another unit of the same hard disk drive 300 is to be subjected to data erasure, its data is erased under the same conditions (step S804).

When no more units of the same hard disk drive 300 are to be subjected to data erasure, step S806 is performed to judge whether any different hard disk drive is to be subjected to data erasure (i.e., to check for a hard disk drive whose data is to be erased under different conditions). The controller 103 may automatically formulate the above judgment. An alternative is to let the controller 103 formulate the above judgment in accordance with the information that is entered into the controller 103 by the operator. If any different hard disk drive 300 is to be subjected to data erasure, the information about the hard disk drive 300 targeted for data erasure is entered into the controller 103 (step S802). When no more units of a different hard disk drive 300 are to be subjected to data erasure, the apparatus is turned OFF (step S807) to terminate the process.

As described above, the data erasure apparatus 1 according to the present embodiment varies the manner of driving in the magnetic field generation space 102 in accordance with the size of the hard disk drive 300 targeted for data erasure, the material of the housing, and the material of the magnetic disk 301 contained in the hard disk drive 300. This ensures that the data stored on the hard disk drive 300 targeted for data erasure can be erased under optimum conditions. As a result, the hard disk drive data can be erased properly and efficiently.

Figure 9:
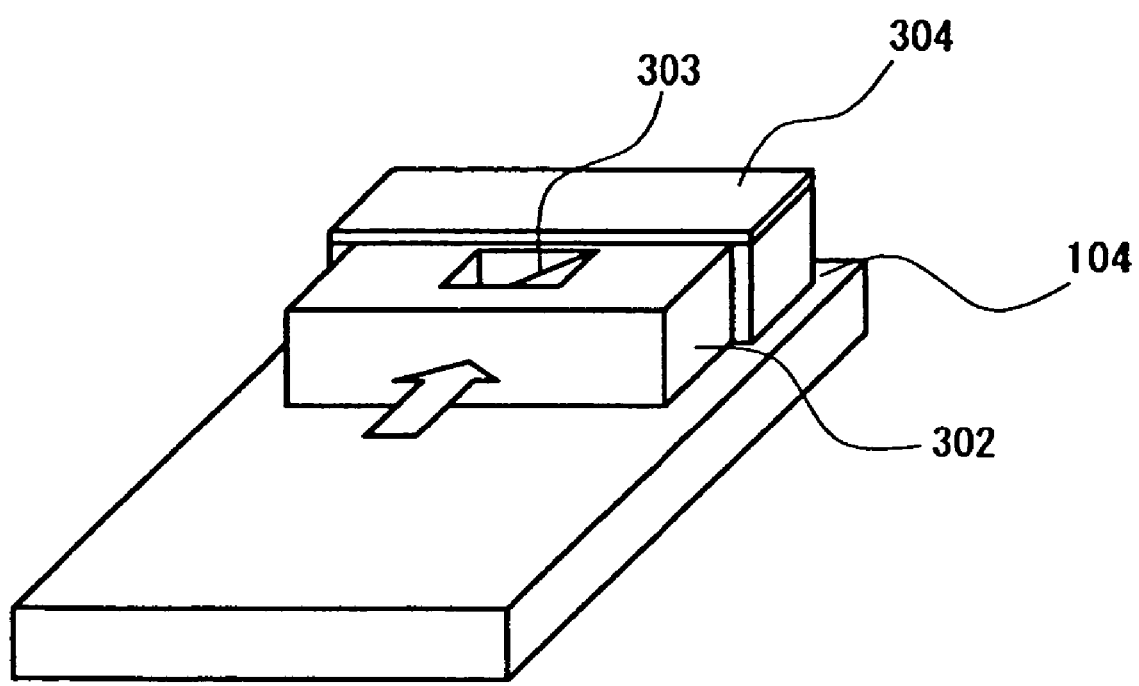
FIG. 9 is a perspective view illustrating another embodiment in which the hard disk drive is inclined when it is retained.

The method for inclining the hard disk drive 300 from the direction of the data erasure magnetic field in the erasure achievement area B, which is described with reference to FIGS. 7(a) and 7(b), is not always provided by the functionality of the hard disk drive retainer 104. For example, a sloping base 302 may alternatively be used as indicated in FIG. 9 so that the hard disk drive 300 targeted for data erasure is inclined when it is secured. As is the case with the hard disk drive 300, the sloping base 302 can be secured to the hard disk drive retainer 104. The sloping base 302 includes a sloped section 303, which is used so that the hard disk drive 300 is inclined when it is mounted.

The hard disk drive 300 is mounted on the sloped section 303, and the sloping base 302 is secured to the hard disk drive retainer 104 so that a top cover 304 secures the hard disk drive 300. The hard disk drive 300 is then secured while it is inclined. When the sloping base 302 is used, the operator directly sets the inclination of the hard disk drive 300 when the hard disk drive 300 is secured to the hard disk drive retainer 104. This eliminates the necessity for driving the hard disk drive retainer 104.

The example described above varies the conditions for determining the path for moving the hard disk drive retainer 104, the speed at which the hard disk drive retainer 104 moves, and the inclination of the hard disk drive 300 that is secured to the hard disk drive retainer 104. In addition, however, the drive conditions for driving the data erasure apparatus 1 can also be applied is the same manner as described above. For example, such conditions may include the number of times the magnetic disk 301 passes the erasure achievement area B.

In a situation where the loss of magnetic force may be likely to occur in the data erasure magnetic field when, for instance, the magnetic disk 301 is made of a metal substance or the hard disk drive 300 has a ferromagnetic housing, the magnetic disk 301 is allowed to pass the erasure achievement area B a multiple number of times so that the information stored on the magnetic disk 301 is erased with increased certainty.

In the example described above, the manner of moving the hard disk drive retainer 104 in the magnetic field generation space 102 is determined in accordance with the size of the hard disk drive 300, the material of the housing, and the material of the magnetic disk contained in the hard disk drive 300. The size of a hard disk drive currently in the market and the materials of the housing and magnetic disk are roughly determined depending on the type of the hard disk drive. Therefore, when the controller 103 stores beforehand the manner of driving the X-axis movement section 105, Y-axis movement section 106, and hard disk drive retainer 104, which varies with the type of the hard disk drive, the process for erasing data from the hard disk drive can be started simply by specifying the type of the hard disk drive targeted for data erasure and without having to specify the components of the hard disk drive on an individual basis.

It is conceivable that the size and model number of the hard disk drive, the type of the employed interface, and other relevant information may be stored in the controller 103 as the information about a hard disk drive type. In other words, the size of a currently marketed hard disk drive and the materials of the employed housing and magnetic disk are roughly determined in accordance with the size and model number of the hard disk drive and the type of the employed interface so that appropriate conditions for moving the hard disk drive 104 for data erasure purposes are determined.

An alternative is to let the controller 103 store a plurality of sets of preset conditions, which include the settings concerning the drive paths and drive speeds for the X-axis movement section 105 and Y-axis movement section 106 and the inclination of the hard disk drive 300 secured to the hard disk drive retainer 104, without regard to the size and model number of the hard disk drive, the type of the employed interface, or other relevant information about the hard disk drive. Data can then be erased from the hard disk drive 300 simply by selecting one of the plurality of sets of preset conditions, which are stored in advance.

While the present invention has been described in terms of preferred embodiments, those skilled in the art will recognize that the present invention is not limited to the preferred embodiments, and that various design modifications and other changes may be made to the preferred embodiments without departing from the spirit and scope of the present invention. For example, although the foregoing description assumes that a magnetic disk for horizontal magnetic recording is used, the present invention can also be applied to a magnetic disk for vertical magnetic recording.

What is claimed is:

1. A method for erasing data recorded on a magnetic disk, which is housed in a magnetic disk drive, by using an external erasure magnetic field generated by an external erasure magnetic field generator, the method comprising:

moving a first magnetic disk drive in a first direction and a second direction orthogonal to the first direction within an external erasure magnetic field in a moving state appropriate for the type of the first magnetic disk drive, and erasing data recorded on a magnetic disk in the first magnetic disk drive; and moving a second magnetic disk drive, which differs in type from the first magnetic disk drive, within an external erasure magnetic field in a moving state that differs from the moving state of the first magnetic disk drive, and erasing data recorded on a magnetic disk in the second magnetic disk drive.

2. The method according to claim 1, wherein the first magnetic disk drive includes a first predetermined component that is made of a nonconductor; wherein the second magnetic disk drive includes a second predetermined component that is made of a conductor; and wherein the second magnetic disk drive moves within the external erasure magnetic field at a lower speed than the first magnetic disk drive.

3. The method according to claim 2, wherein the first predetermined component is a circuit board for the first magnetic disk, and the second predetermined component is a circuit board for the second magnetic disk.

4. The method according to claim 1, wherein the first magnetic disk drive includes a ferromagnetic housing, whereas the second magnetic disk drive includes a nonferromagnetic housing; wherein the first magnetic disk drive moves within the external erasure magnetic field while the direction of the external erasure magnetic field is inclined from the recorded magnetization direction of a magnetic disk; and wherein the second magnetic disk drive moves within the external erasure magnetic field while the direction of the external erasure magnetic field is parallel to the recorded magnetization direction of a magnetic disk.

5. The method according to claim 4, wherein the first magnetic disk drive includes a magnetic disk circuit board that is made of a nonconductor; wherein the second magnetic disk drive includes a magnetic disk circuit board that is made of a conductor; and wherein the second magnetic disk drive moves within the external erasure magnetic field at a lower speed than the first magnetic disk drive.

6. The method according to claim 1, wherein the first magnetic disk drive includes a magnetic disk whose diameter is not greater than the width of the external erasure magnetic field, whereas the second magnetic disk drive includes a magnetic disk whose diameter is greater than the width of the external erasure magnetic field; wherein the first magnetic disk drive moves unidirectionally so that the entire magnetic disk of the first magnetic disk drive passes within the external erasure magnetic field; and wherein the second magnetic disk drive moves in a first direction so that a part of the magnetic disk of the second magnetic disk drive passes within the external erasure magnetic field, moves in a direction crossing the first direction, and then moves so that a part of the magnetic disk, which passed outside the external erasure magnetic field during the move in the first direction, passes within the external erasure magnetic field.

7. A method for erasing data recorded on a magnetic disk, which is housed in a magnetic disk drive, by using an external erasure magnetic field generated by an external erasure magnetic field generator, the method comprising:

retaining the magnetic disk drive so that the direction of the external erasure magnetic field is inclined from the recorded magnetization direction of a magnetic disk; and moving the magnetic disk drive in a first direction and a second direction orthogonal to the first direction within the external erasure magnetic field while the direction of the external erasure magnetic field is inclined from the recorded magnetization direction of the magnetic disk, and erasing data recorded on the magnetic disk.

8. The method according to claim 7, wherein the magnetic disk drive moves in a plane along the direction of the external erasure magnetic field to erase data recorded on the magnetic disk.

9. The method according to claim 7, wherein a magnetic disk drive having a ferromagnetic housing moves within the external erasure magnetic field while the direction of the external erasure magnetic field is inclined from the recorded magnetization direction of a magnetic disk in the magnetic disk drive; and wherein a magnetic disk drive having a non-ferromagnetic housing moves within the external erasure magnetic field while the recorded magnetization direction of a magnetic disk in the magnetic disk drive is parallel to the direction of the external erasure magnetic field.

10. A data erasure apparatus for erasing data recorded on a magnetic disk, which is housed in a magnetic disk drive, by using an external erasure magnetic field, the data erasure apparatus comprising:

an external erasure magnetic field generator to generate an external erasure magnetic field;

a retention/movement mechanism to retain the magnetic disk drive and moving the magnetic disk drive in a first direction and a second direction orthogonal to the first direction within the external erasure magnetic field; and a controller to operate the retention/movement mechanism under conditions appropriate for the type of the magnetic disk from which data is to be erased.

11. The data erasure apparatus according to claim 10, wherein the controller controls the retention/movement mechanism so that a magnetic disk drive having a magnetic disk made of a conductor moves within the external erasure magnetic field at a lower speed than a magnetic disk drive having a magnetic disk made of a nonconductor.

12. The data erasure apparatus according to claim 10, wherein the controller controls the retention/movement mechanism so that a magnetic disk drive with a circuit board having a magnetic disk made of a conductor moves within the external erasure magnetic field at a lower speed than a magnetic disk drive with a circuit board having a magnetic disk made of a nonconductor.

13. The data erasure apparatus according to claim 10, wherein the retention/movement mechanism retains a magnetic disk drive having a ferromagnetic housing so that the direction of the external erasure magnetic field is inclined from the recording surface of a magnetic disk in the magnetic disk drive, and moves the magnetic disk drive within the external erasure magnetic field while the direction of the external erasure magnetic field is inclined from the recording surface of the magnetic disk.

14. The data erasure apparatus according to claim 13, wherein the controller controls the retention/movement mechanism so that a magnetic disk drive having a magnetic disk made of a conductor moves within the external erasure magnetic field at a lower speed than a magnetic disk drive having a magnetic disk made of a nonconductor.

15. The data erasure apparatus according to claim 10, wherein the retention/movement mechanism unidirectionally moves a magnetic disk drive whose magnetic disk diameter is not greater than the width of the external erasure magnetic field so that a magnetic disk in the magnetic disk drive entirely passes within the external erasure magnetic field; and wherein the retention/movement mechanism moves a magnetic disk drive whose magnetic disk diameter is greater than the width of the external erasure magnetic field in a first direction so that a part of a magnetic disk in the magnetic disk drive passes within the external erasure magnetic field, moves the magnetic disk drive in a direction crossing the first direction, and then moves the magnetic disk drive in a direction opposite to the first direction so that a part of the magnetic disk, which passed outside the external erasure magnetic field during the move in the first direction, passes within the external erasure magnetic field.

* * * * *